June 30, 1931. E. J. KEARNEY ET AL 1,812,702
MACHINE TOOL
Filed Feb. 17, 1928   5 Sheets-Sheet 5

INVENTORS
Edward J. Kearney
Joseph B. Armitage
BY Fred G. Parsons
ATTORNEY

Patented June 30, 1931

1,812,702

UNITED STATES PATENT OFFICE

EDWARD J. KEARNEY, OF WAUWATOSA, AND JOSEPH B. ARMITAGE, OF MILWAUKEE, WISCONSIN, ASSIGNORS TO KEARNEY & TRECKER CORPORATION, OF WEST ALLIS, WISCONSIN, A CORPORATION OF WISCONSIN

MACHINE TOOL

Application filed February 17, 1928. Serial No. 254,970.

This invention relates to machine tools and particularly to milling machines.

It is an object generally to simplify and improve the design, construction and operation of the structure and transmission of milling machines and of machine tools generally.

A particular purpose is to provide a structure having great rigidity together with convenience of operation and adjustment.

A further purpose is to provide improved transmission and control means, and combined with an improved structure in an improved manner.

Other purposes will be apparent from this specification.

The invention consists in the particular arrangement and combination of parts as herein revealed and claimed and in such modification thereof as may be equivalent thereto.

In the drawings the same reference numerals are used for the same parts wherever they appear.

Figures 1, 2, 9:
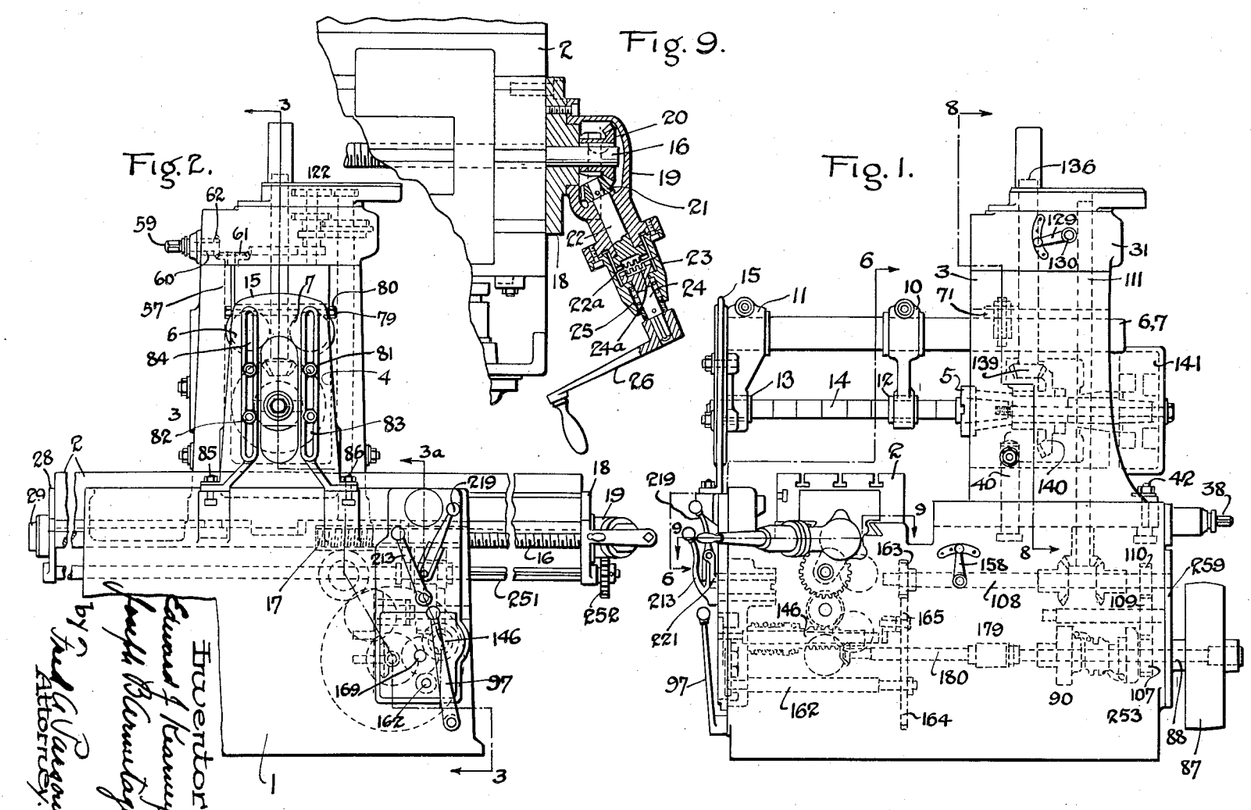
Fig. 1 is a left side elevation of a milling machine in which the invention is included.
Fig. 2 is a front view of the same machine.
Fig. 9 is a horizontal section along line 9—9 of Fig. 1 with a portion of a top view of the adjoining table.

The main members and general arrangement of the machine may be described as follows:

The machine provides a stationary support or bed 1, a work support or table 2 slidably guided thereon, for movement to left or right in Fig. 2, and tool supports including a head or column 3 slidably guided on the bed for movement to left or right in Fig. 1 and a carrier 4 slidably guided between two upright head portions for vertical movement. Carrier 4 supports a spindle 5 rotatably journaled therein but prevented from axial movement relative thereto.

The front spindle end (or left end in Fig. 1) may support and drive a variety of tools such as an arbor engaging in axial alignment therewith. A plurality of overarms 6—7 are slidably guided and supported by carrier 4 for movement of each arm parallel with the spindle axis, the guides consisting of bores 8—9 whereby the overarms and spindle are maintained in exact predetermined spacing when the arms are clamped in the bores.

Pendants 10—11 are slidably guided and supported by the overarms, having guides consisting of bores fitted to the arms as clearly shown in the drawings and having bearings 12—13 in which arbor 14 is journaled. The overarm guides and bushing of each pendant are in the same predetermined relationship previously mentioned, whereby the overarms and pendants serve to originally align and rigidly maintain the arbor in exact axial alignment with the spindle when the pendants and arms are clamped. Pendant 11 may be rigidly secured to a removable harness or brace 15 which in turn may be rigidly secured to the support or bed 1.

Figures 3, 4, 5:
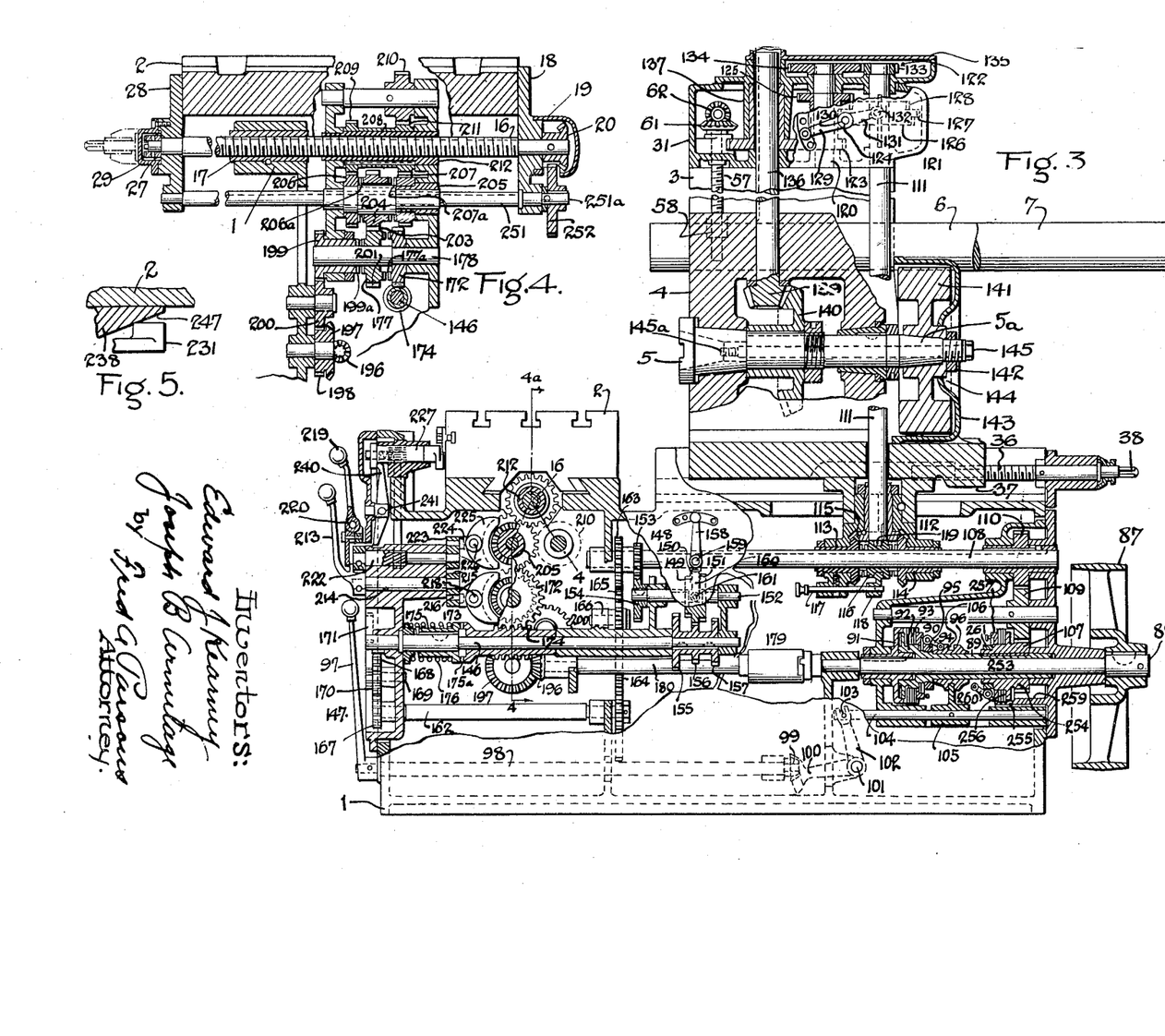
Fig. 3 is a left hand view, mainly in section along line 3—3 of Fig. 2 as to the right hand portion, and line 3—3a as to the left hand portion and enlarged.
Fig. 4 is a fragmentary development along line 4—4 of Fig. 3 as to the central portion, and along line 4—4a as to the end portions.
Fig. 5 shows a table control dog and trip post in section along line 5—5 of Fig. 12.

The table 2 has provided a screw 16, Fig. 4, journaled therein and axially movable therewith and threaded in a nut 17 fixed in bed 1. Screw 16 may be turned to move the table either manually or by the means of power transmission and control mechanism, as will be described. The manual means for moving the table consists of crank mechanism which may be alternatively applied to either end of the table screw as follows. At the right end Figs. 2 and 9, brackets 18 and 19 support bevel gears 20—21 and a shaft 22 connected with the screw by the means of the bevel gears. A cap or bearing 23 removably fixed on bracket 19 supports a shaft 24 in axial alignment with shaft 22 and with the shaft ends adjacent but urged apart by a spring 25. Shaft 24 has a squared end to receive a removable crank 26. When the crank is pressed in against the resistance of spring 25 complementary clutch portions 22a and 24a of the adjacent shaft ends engage to enable the screw 16 to be turned from the crank, but when released the clutch portions are disengaged by the spring whereby the screw may not turn the crank during normal operation. The other or left end of the screw 16, Fig. 4. is provided with a clutch member 27 having teeth complementary to the clutch portion 24a of shaft 24, Fig. 9, and bracket 28, Fig. 4 is formed to receive bracket 23 when a cap 29 interchangeable therewith, is removed, and to hold it in proper relative position for shaft 24 and crank 26 to operate on clutch member 27, whereby either end of the screw may be used for manual operation according to convenience. The slides or guides in bed 1 for table 2 may be of any well known suitable form.

Figure 8:
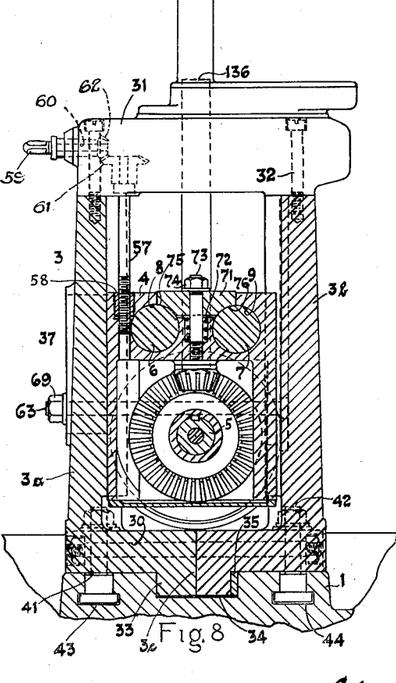
Fig. 8 is a partial view mainly in section along line 8—8 of Fig. 1 and enlarged.

The head 3 may be in one integral piece but in the present instance is constructed of several portions forming a single unitary structure. As shown in Fig. 8, a left portion 3a and a right portion 3b, are rigidly spaced at the lower end by means of faces engaging at 3c and clamped together by suitable bolt or rods such as bolt 30. At the upper end, the portions 3a and 3b are rigidly spaced by the means of a cap member 31 and a number of bolts such as 32. The head is guided on bed 1 by the means of a downwardly projecting abutment portion 33 guided in a complementary bed slot 34 there being an adjustable gib 35 of any suitable well known form.

Figure 6:
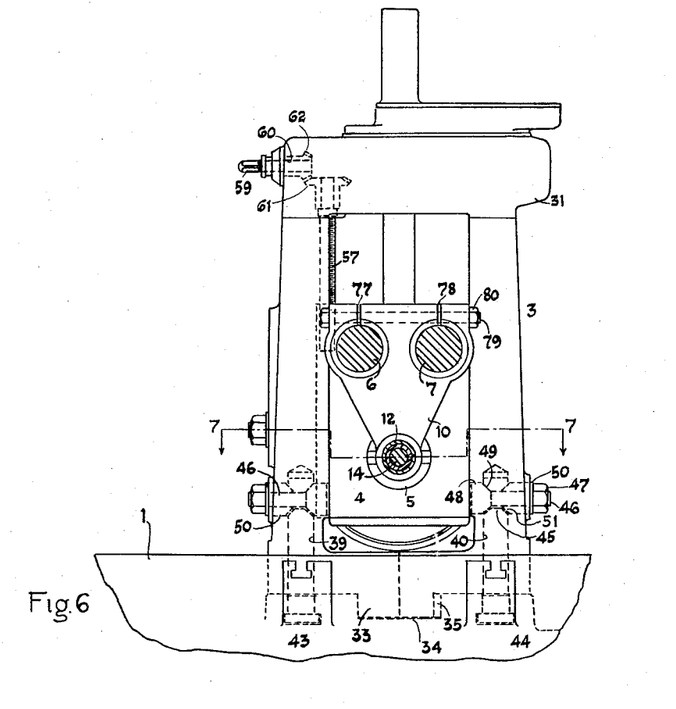
Fig. 6 shows a portion of Fig. 2 enlarged.

Head 3 has a screw 36, Fig. 3, journaled in bed 1 and fixed against axial movement and threaded in a nut portion 37 fixed with the head. Screw 36 may be turned to move the head manually by the means of a suitable crank, not shown, applied to a squared end portion 38. The head may be clamped rigidly in any position of adjustment by the means of two front bolts 39—40, Figs. 6 and 1, and two rear bolts 41—42, Figs. 8 and 1, all having T heads engaging T slots 43 or 44 in bed 1. Bolts 41—42 are of usual construction as clearly shown. Bolts 39—40 are constructed to avoid extending the bolts through the entire head height. Such construction is the same for both and will be described for bolt 40 only as follows. As seen in Fig. 6, bolt 40 has a transverse bore 45 at its upper end, through which a rod or member 46 extends outside the head and threadedly engages a nut 47. Rod 46 has an enlarged head 48 slidably fitting a bore in head 3 and having a conical portion 49 engaging a complementary conical socket formed at the one end of bore 45. A sleeve 50 is slidably fitted in head 3 and has an axial bore in which the reduced end of rod 46 is fitted, the sleeve having a conical end 51 engaging a complementary conical socket formed at the other end of bore 45. Sleeve 50 and rod 46 are prevented from rotating by any suitable means not shown and when nut 47 is suitably turned the conical portions of the rod and sleeve are forced toward one another forming oppositely disposed wedges tending to lift bolt 40, there being clearance on the underside of the conical socket such that the T head of bolt 40 engages the T slot to clamp the head 3 before the conical wedge portion are seated.

Figure 7:
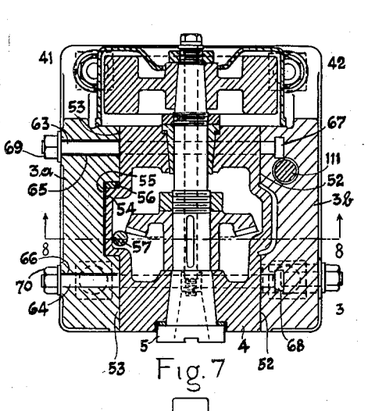
Fig. 7 is a horizontal section along line 7—7 of Fig. 6.

Carrier 4 is fitted closely for vertical movement between interior finished faces 52 and 53, Fig. 7, of the head portions 3a—3b the complementary head and carrier faces acting as a guide or slide aligning the carrier in one vertical plane. For alignment in the other vertical plane the carrier is provided with a projecting abutment portion 54, Fig. 7, fitted in a complementary vertical groove 55 in the head member 3b, there being a gib member 56 of any suitable well known form.

The carrier 4 is provided with a screw 57, Figs. 2, 3, 7, 8, journaled in the cap member 31 and prevented from vertical movement and threadedly engaging a nut portion 58 of the carrier. Screw 57 may be turned by the means of a suitable crank, not shown, applied to the squared end 59 of a shaft 60 which is connected with the screw by the means of bevel gears 61—62. The carrier may be rigidly clamped in any position of its adjustment by the means of a plurality of T bolts 63—64 axially slidable in suitable bores in the carrier, and vertically movable therewith, the left ends Fig. 7 moving in slots 65—66 in the head member 3a and the right ends, Fig. 7, being of T form and moving in T slots 67—68. When bolts 65—66 are tightened by the nuts 69—70, the head portions 3a—3b are sprung or moved toward one another sufficiently to rigidly frictionally bind the carrier which then acts as a stiffening member for the head whereby the head and carrier form a rigid unitary structure for supporting spindle 5 against displacement.

The two overarms 6—7 may each be manually adjusted in their carrier slides, whereby they may be moved back out of the work zone for certain operations, or may be moved forward to permit pendant 11 to be clamped with harness 15, irrespective of the adjustment of head 3. The arms may be clamped in any relative carrier position by the means of a clamp member 71, Figs. 1–8, socketed in carrier 4 for movement toward or from the arms. Member 71 is pressed away from the arms by a spring 72 but may be moved to clamp the arms by the means of a bolt 73 and nut 74, in which case end portions 75—76 simultaneously contact with the respective arms and clamp them strongly in their carrier slides.

The pendants 10—11 may each be manually adjusted in their overarm slides whereby to position them individually for different arbors or tools. They may each be clamped with the arms by means which are similar for each and will be described only for pendant 10. Slots 77—78, Fig. 6, provide a certain amount of resiliency for the pendant portions which contact the overarms, whereby the bores forming the slide may be simultaneously contracted by the means of a bolt 79 and nut 80 to frictionally engage both overarms.

Harness member 15 provides for the vertical movement of pendant 11, which moves with the carrier. Bolts 81—82, Figs. 1-2, are threaded in the pendant and pass through the vertical slots 83—84 in the harness. By loosening these bolts vertical adjustment may take place, or the bolts may be set up to rigidly clamp the harness and pendant. The harness may be rigidly fixed with the bed 1 by the means of T bolts 85—86, Fig. 2, having heads fitting T slots as shown, formed in an upward projection of the bed. Such slots permit a certain amount of adjustment of the harness in the direction of the spindle axis. The bolts 81—82 may be removed and bolts 85—86 loosened to remove the harness in case the work does not require its use.

Transmission mechanism is incorporated in the machine both for table movement and for spindle rotation. Each transmission originates in a common drive pulley 87, Figs. 1—3, which forms a power source for the machine. The train to spindle 5 is as follows. Pulley 87 is fixed on a shaft 88, Fig. 3, upon which a sleeve 89 is free to rotate unless clutched thereto. A clutch, generally denoted by the numeral 90, may be of any suitable type but as here shown includes a driving member 91, a driven member 92 formed integral with sleeve 89 and a series of flat discs or plates 93 having alternate plates slidably keyed with the driving and driven members respectively. Plates 93 may be forced into mutual driving contact by the means of a lever 94 pivoted on an adjustable nut member 95 for the one end of the lever to contact an end plate of the series when the lever is swung by a suitably formed spool 96 slidably mounted on sleeve 89. When the spool is moved out of contact with the lever the plates 93 are released from mutual contact and the sleeve stops. Spool 96 may be moved in opposite directions to start or stop the sleeve by the means of a hand lever 97, Fig. 3, fixed on a shaft 98 which is connected with the spool by bevel gear 99, engaging with bevel segment 100 fixed on a shaft 101 upon which is also fixed a fork lever 102 engaging a pin 103 fixed in a rod 104 upon which is fixed a fork member 105 engaging an annular groove 106 in spool 96. A gear 107 is keyed to sleeve 89 and drives a shaft 108 through gears 109—110. Shaft 108 drives a shaft 111 through a reverser generally denoted by the numeral 112, Fig. 3. Reverser 112 may be of any suitable form but as here shown is constructed as follows. Rotatably slidable on shaft 108 are bevel gears 113—114 engaging respectively with opposite sides of a bevel gear 115 fixed on shaft 111. Slidably splined with shaft 108 is a clutch member 116, at each end of which are clutch teeth which may alternatively engage complementary clutch teeth on the bevel gears 113—114, respectively, whereby the member 116 may drive either bevel gear, there being also a central position of the member in which there is no driving engagement and neither gear is driven. Accordingly as the member 116 is positioned the shaft 111 is rotated in the one or the other direction, or stands idle. Member 116 may be manually shifted by the means of a rod 117 having a fork member 118 engaging an annular groove 119 in the member 116, there being an opening not shown in the walls of bed 1, whereby the rod may be reached.

Shaft 111 extends upward interiorly of the head member 3b, Fig. 7, passing through head member 31, Fig. 3. A shaft 120 is driven from shaft 111 alternatively through the one or the other of a plurality of rate changers, generally denoted by the numerals 121—122 respectively. Rate changer 121 is of the lever operated quick change type and consists of the different diameter gears 123—124—125 fixed on shaft 120 and complementary different diameter gears 126—127—128 fixed together and slidably splined on shaft 111. Gears 126—127—128 may be moved to engage one at a time with gears 123—124—125 respectively by the means of a hand lever 129 fixed on a shaft 130, upon which is also fixed a lever 131, having a pivoted fork member 132 engaging the sides of a gear 127.

Rate changer 122 is of the interchangeable or slip gear type and consists of a gear pair 133—134 removably and interchangeably splined on the ends of the shafts 111—120. Being of different diameters the gears give different rates to the shaft 120 when removed and replaced in reversed order, and a large number of other rates may be obtained by the use of other still differently diametered pairs each of which may also be reversible. A cover 135 is removable to permit access to the removable gears.

The rate changers ordinarily tend to drive shaft 120 at different rates, and to prevent damage the one is disengaged when the other is in use. To disengage the rate changer 122, one or both of the gears 133—134 are removed and to disengage the rate changer 121, the gears 126—127—128 are positioned by lever 129 as shown in Fig. 3 for all the gears to be unmeshed from the complementary gears on shaft 120. In the case that the operating requirements of a given machine are such that both rate changers are not needed the parts individual to the one not required are removed from the machine.

Shaft 120 drives a shaft 136 through a gear 137 slidably splined therewith and meshed with the gear 138, the shaft being journaled in carrier 4 between overarms 6—7, Fig. 8, and axially movable with the carrier. Shaft 136 drives spindle 5 through a bevel gear 139 fixed thereon or integral therewith and a bevel gear 140 fixed with the spindle. A flywheel 141 is removably fixed on the rear spindle end by the means of a tapered seat 5a and a nut 142. A removable flywheel cover 143 is fixed on the carrier for vertical movement therewith and provides an opening 144 through which the rear end of the spindle projects for convenient access to the rear end of a draw bolt or rod 145 which extends through an axial spindle bore to engage a threaded end 145a with tools supported from the front end of the spindle, the rear draw rod end being formed to receive a crank or wrench for such purpose.

For power movement of table 2 there is provided a variable feed or cutting transmission driven from shaft 108 and through the clutch 90. The drive to shaft 108 has already been described. A shaft 146 is driven from shaft 108 alternatively through the one or the other of a plurality of feed rate changers, generally denoted by the numerals 147 and 148 respectively. Rate changer 148 is of the lever operated, quick change type and consists of the different diameter gears 149—150—151 fixed together and slidably keyed on a shaft 152 driven from shaft 108 through meshed gears 153—154. Gears 149—150—151 are respectively engageable one at a time with the gears 155—156—157 fixed on the rear end of shaft 146, by the means of a hand lever 158 fixed on shaft 159 upon which is also fixed a lever 160 having a pivoted shoe 161 engaging the sides of the gear 150. Range changer 147 is of the interchangeable or slip gear type and may drive the front end of shaft 146 as follows. A shaft 162 is driven from shaft 108 through gears 163—164 connected by an idler 165 supported on stud 166. The rate changer 147 is of the removable or slip gear type and is interposed between the front ends of shafts 162 and 146 and includes gears 167—168 forming a pair removably splined respectively to shaft 162 and to an intermediate shaft 169, and gears 170—171, forming a pair respectively removably splined to the shaft 169 and shaft 146. The bores of gears 167—168—170—171, the ends of the shafts 162—169—146 and the center distance of the shafts 162—169 and 146 are constructed for the gears to be interchangeable within the pairs and for the pairs to be interchangeable, whereby either pair of gears may be used in either position in the rate change train and the gears of either pair may be reversed in position within the pair. The gears of a given pair are of different diameter and the different pairs are of different ratio whereby reversing the gears of ether pair effects a predetermined rate change. Other gear pairs, not shown, of still different ratio, may be substituted for either pair. Thus a considerable number of rate changes may be effected by the two pairs shown and a great variety of rate changes may be conveniently effected by the substitution of other pairs, according to the rate desired.

The rate changers 147 and 148 ordinarily would tend to drive shaft 146 at different rates, and to prevent damage the one is disengaged when the other is in use. To disengage the rate changer 147, one or more of the gears composing the rate change train is removed, and to disengage the rate changer 148 the lever 158 is positioned for disengagement of gears 149—150—151 from any of the gears 155—156—157 there being intermediate positions in which no gears are meshed. In the case that the requirements of a given machining operation are such that both feed rate changers are not required, most of the parts individual to the one not required may be removed from the machine, but the mountings therefor are preferably simultaneously present in the structure whereby both may be used if later required.

Shaft 146 drives a worm wheel 172, Figs. 3 and 4, through a safety or overload clutch generally denoted by numeral 173, and a worm 174 rotatably supported on shaft 146 and meshing with the worm wheel 172. Safety clutch 173 consists of a sleeve 175 slidably splined on shaft 146 and having clutch teeth 175a normally pressed into engagement by the means of a spring 176 with complementary clutch teeth on the adjacent end of the hub of worm 174. The engaging clutch faces are angular in the direction of the torque whereby a force transmitted sets up an axial thrust in direct proportion to the force and tending to disengage the clutch teeth. Spring 176 opposes only a predetermined resistance to such force whereby it will permit clutch disengagement when a corresponding load is exceeded. The worm wheel 172 is rotatable on a shaft 178, and may be clutched or unclutched with a member 177 supported in axial alignment therewith and axially movable, by the means of clutch teeth 177a on member 177 and engageable with complementary teeth on the adjacent hub of the worm wheel according to the position of the member.

Member 177 may alternatively be driven from a quick traverse train as follows. The shaft 88 driven from pulley 87 extends into a coupling device generally denoted by the numeral 179, Fig. 3, into which also extends the end of a shaft 180.

Figures 10, 11:
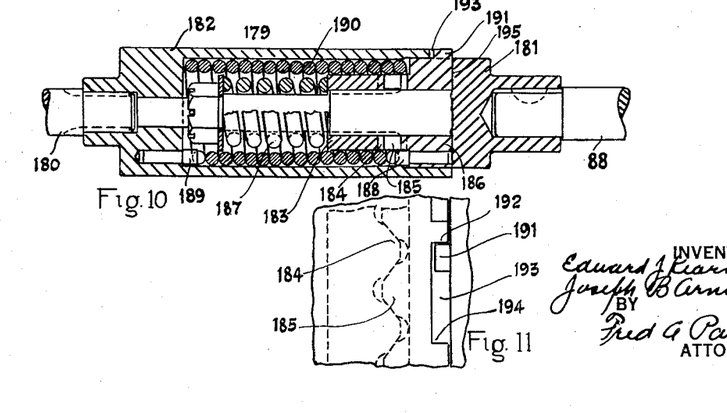
Fig. 10 is a section through a coupling device 179 shown in Fig. 3.
Fig. 11 is a developed view of parts shown in Fig. 10.

The coupling device 179, Fig. 3, includes a combined safety or overload device and a shock absorbing device as shown in detail in Figs. 10–11. Removably splined on the end of shaft 88 is a coupling member 181, and removably splined on the end of shaft 180 is a coupling member 182. The members are connected by the following mechanism. A clutch member 183 is slidably keyed with member 181 and engages clutch teeth 184 with complementary clutch teeth 185 on a member 186 which is free to rotate on member 181 except as restrained by the clutch teeth. The engaging clutch faces are angular in the direction of the torque, whereby a force transmitted sets up an axial thrust in direct proportion to the force and tending to disengage the clutch teeth. A spring 187 opposes only a predetermined resistance to such force whereby it permits clutch disengagement when a corresponding load is exceeded. Member 183 may drive member 182 through abutments 188—189 fixed with the respective members, and a spring 190, the end coils of which have end faces in a plane parallel with the spring axis and resting against the respective abutments whereby a load transmitted tends to uncoil the spring in proportion to the load. When no power is being transmitted the spring stands in its free position and the parts then stand in relative position as shown in the development, Fig. 11, with an abutment lug or tooth 191, fixed on member 186, adjacent an abutment face 192 of a slot 193 in the end of member 182. When a load is applied the lug moves away from face 192, spring 190 opposing a cushioning or resilient shock absorbing resistance to such movement, but not sufficient but that under normal loads the lug 191 will move to contact with an abutment face 194 of the slot after which the load is transmitted positively direct from the lug to the member 182. Spring 190 has little or no initial loading or tension, whereby the load may be applied with no initial shock. Spring 187 has an initial load proportioned to prevent axial clutch disengaging movement starting until spring 190 has built up a predetermined load, or until lug 193 rests against face 194, after which spring 187 acts as a shock absorbing or cushioning device for such heavier loads. Opposed friction faces at 195 on members 181—186 as well as friction of the engaged clutch tooth faces tend to prevent axial clutch disengagement before such predetermined load is reached.

Fixed on or integral with shaft 180 is a bevel pinion 196, Figs. 3 and 4, meshing with gear 197 fixed with gear 198 which drives a gear 199 through an idler 200. Gear 199 is rotatably supported in axial alignment with member 177 and may be clutched or unclutched therewith by the means of teeth 199a adjacent the member, which has complementary teeth engageable therewith only when the teeth 177a are disengaged from worm wheel 172, there being a central position in which the member is disengaged and stops.

Thus member 177 may be driven at a feed rate through either of the rate changers 147 or 148 if member 177 is engaged with worm wheel 172 or alternately at a rapid traverse rate if member 177 is engaged with gear 199, or the member may be disengaged to stop the shaft.

Fixed with member 177 is a gear 201 driving a gear 203 fixed on the clutch member 204 slidably splined on a sleeve 205. Supported for rotation adjacent opposite ends of member 204 are gears 206—207 having clutch teeth 206a—207a for which the member 204 is provided with complementary clutch teeth on the opposite ends. The member 204 may be moved axially in the one or the other direction to engage and drive the one or the other gear, or may be centrally positioned out of engagement with either gear. Gear 206 may drive a sleeve 208 through a gear 209 fixed on the sleeve, and gear 207 may drive the sleeve 208 through an idler gear 210, Figs. 3–4–13 and gear 211 fixed on the sleeve. The table screw 16 is splined for axial movement through sleeve 212 and when the sleeve is rotated, moves the table as previously described. The clutch member 177, gear 199, gear 172 and parts associated therewith constitute means for choice between feed and rapid traverse trains, and in series with a reverser consisting of clutch member 204, gears 206—207—209—210—211, sleeve 212 and parts associated therewith, whereby either train may operate the table in either direction. Control means are provided for manual shifting of clutch member 177, consisting of a hand lever 213, Figs. 12 and 13, fixed on a shaft 214 upon which is also fixed a lever 215 having a pivoted shoe 216 engaging a suitable slot in a fork member 217 which slides on a rod 218 and engages the sides of the gear 201 which is fixed with the member 177 whereby movement of lever 213 in either direction shifts clutch member 177 in a corresponding direction.

Figures 12, 13:
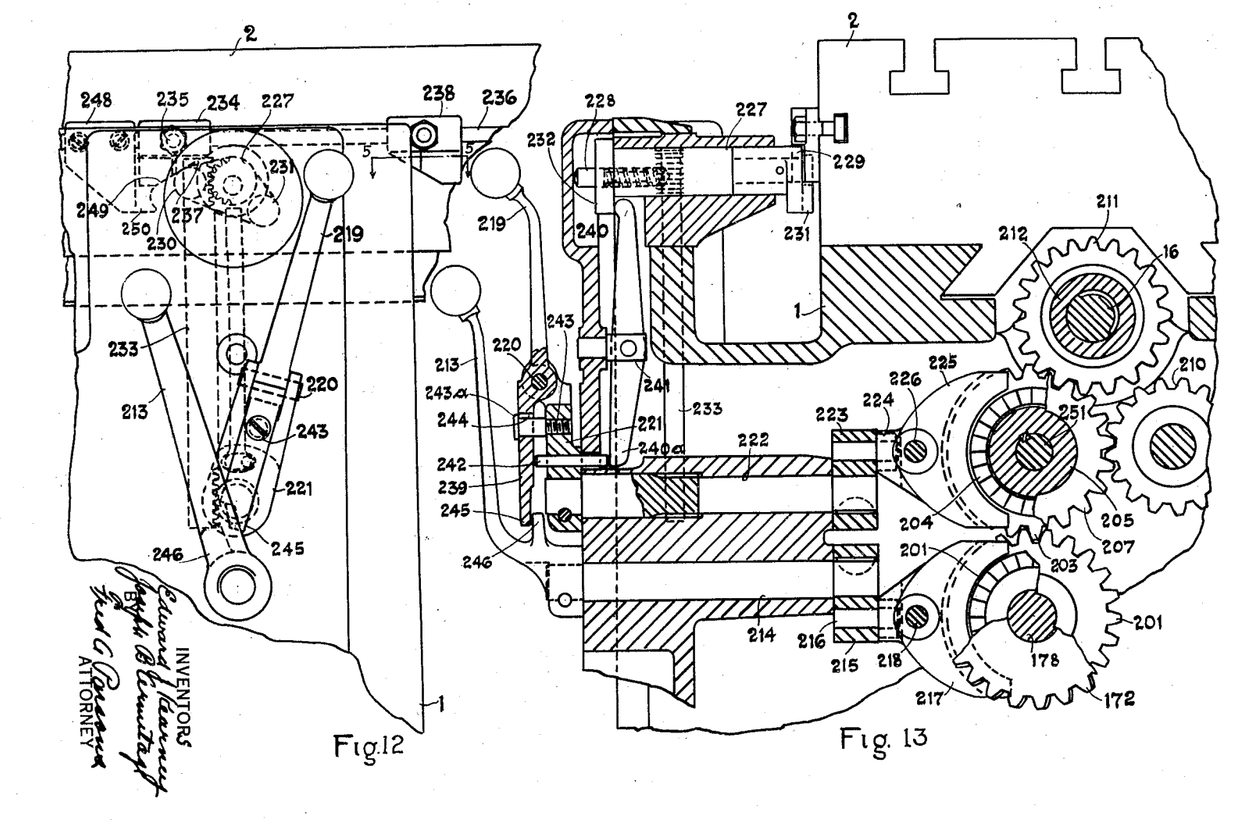
Fig. 12 shows a portion of Fig. 2 enlarged.
Fig. 13 is an enlargement of part of the left hand portion of Fig. 3.

Control means are provided for manual shifting of clutch member 204. A lever 219, Figs. 12 and 13, is pivoted at 220 with a lever 221 fixed on shaft 222, the pivot 220 being such that the lever 219 has one movement for turning shaft 222 and has another movement transverse thereto for reasons later explained. A lever 223 fixed on shaft 222 has a pivoted shoe 224 engaging a suitable slot in a fork 225 which slides on a rod 226 and engages the sides of gear 203. By the described mechanism the movement of lever 219 in either direction about the axis of the shaft 222 shifts the clutch member 204 in a corresponding direction.

Control means are provided for a power shifting of clutch member 204 as follows. A control post 227, Figs. 12 and 13, is rotatable and axially movable but normally pressed to the right in Fig. 13, to the position there shown, by the means of a spring thrust plunger 228. A head portion 229 fixed thereon has fixed therewith eccentric lug portions 230—231 respectively on opposite sides of the post axis. Another head portion 232 fixed at the other end of the post portion limits the axial movement. A vertical rod 233 has rack teeth engaging at the one end with suitable gear teeth on the post 227 and at the other end with suitable gear teeth in rod 222, whereby movement of the hand lever 219 to the right in Fig. 12, to the position there shown moves the lug 230 up and lug 231 down, at the same time that the clutch member 204 which is connected therewith as described, is engaged in a direction to move the table 2 to the right in Fig. 12. A control dog 234, adjustably fixed on table 2 by means of a T bolt 235, Fig. 12, and T slot 236, has an angular face portion 237 adapted during such table movement to contact the lug 230 and move it down again to a position corresponding to the disengaged position of the clutch member 204, thereby causing the table movement to stop at a point predetermined by the position of the adjustable dog. If the lever 219 is swung in the reverse direction for the opposite table movement, a similar table dog 238 reacts similarly on lug 231 to stop the table at a predetermined point.

The dog used to stop the table normally interferes with movement of the control parts to again cause table movement in the same direction, so long as the table remains in the same position. It is sometimes desirable to immediately start the table again in the same direction, and mechanism is provided therefor as follows.

A portion 239 of lever 219, Figs. 12 and 13, moves an arm 240a of a lever pivoted at 241 by means of a pin 242 which is slidably supported in lever 221. The lever has another arm 240 contacting the head portion 232 of post 227. Movement of lever 219 to the left in Fig. 13 about pivot 220 moves the post to the left whereby the lugs 230—231 are moved out of the path of dog movement. Lever 219 may then be swung about the axis of shaft 222 to start the table movement as previously described. The contacting portion of lever 240a is of sufficient area to maintain contact with the end of pin 242 throughout the limited movement of lever 219 about the axis of shaft 222. Lever 221 carries screw 243 which passes through hole 244 in lever portion 239. The head 243a of this screw limits the swing of lever portion 239.

The mechanism described permits manual re-engagement of power table movement immediately after such movement is tripped out by the dogs. In normal operation the work and cutter are brought together at a quick traverse rate. The rate must then be changed to a feed rate to prevent damage. To insure that this is done the dogs previously described may be used to trip the table movement at the point where it is desired to change the rate and after the rate is changed the power movement re-engaged by the mechanism described. To insure that the rate is changed before further forward movement takes place, mechanism is provided to prevent movement of lever 219 for re-engaging the table power movement unless the lever 213 is in feed position, as follows. When the rapid traverse is engaged lever 213, shown in the feed position in Fig. 13, stands to the right instead and a portion 246 of lever 213 stands underneath a portion 245 of lever 219, in a position to prevent movement of lever 219, about the pivot 220 whereby member 227 cannot be disengaged from the trip dog. In the arrangement shown such interference takes place in either position of lever 219 about the axis of shaft 222, whereby irrespective of the direction of table movement the movement can only be re-engaged in the same direction at a feed rate after being tripped.

It is sometimes desirable that the dog should not shift the clutch member 204 during a subsequent return movement after having been moved past a trip lug as just described. For such effect the dogs are constructed as shown in Figs. 5 and 12 for dog 238. A portion 147 is tapered to contact the lug, in this instance lug 231, during a retreat, if the dog has passed the lug during forward movement. In such case the tapered portion forces the post 227 outward to permit the dog to pass but immediately after the dog has passed the lug, the post is forced to working position again by the spring plunger 228. It may be noted that the construction of the interlock which limits the hand movement of member 227 does not prevent the dog movement just described.

Dogs such as dog 248, Fig. 12, are fixed near the limiting points at each end of the travel of table 2. Such dogs have an angular face such as 249, operative on the one or the other of the lugs 230—231, to positively trip out the clutch member 204 before the table reaches the limit of its travel. Such dogs may ordinarily be positioned at a point such that the table cannot be moved past them and subsequently moved by power in the same direction, which might cause damage. If not otherwise limited such further movement of the table is limited by a dog portion 250 which contacts with a portion of the trip post.

Mechanism is provided for the operation of various attachments mounted for movement with table 2, from the table transmission exclusive of the table reverser. Such mechanism is as follows. Sleeve 205, Figs. 3-4, is provided with an axial bore through which a shaft 251 moves axially, being journaled by movement with the table, but splined for rotation with the sleeve. Shaft 251 has an exposed coupling end 251a to which may be attached an element of an attachment drive train, such as a gear 252. Various types of attachments suitable for driving from gear 252 are well known and therefore not shown.

A brake generally denoted by the numeral 253, Fig. 3, is provided for quickly stopping the spindle and feed train, but which is not effective on the rapid traverse train, the mechanism being as follows. Gear 107 has fixed on the extended hub 254 thereof an abutment or plate portion 255. A series of friction plates 256 provide an end plate 257 slidably keyed on the hub 254 and other intermediate plates between plate 257 and abutment 255, alternate plates of which are keyed with the hub 254 and with a member 259 fixed with bed 1. A lever 260 is pivoted at a point intermediate between the arms thereof on an adjustable threaded collar 261, one arm of the lever being contacted when spool 96 moves to the right in Fig. 3 and forcing the other arm to contact the plate 257 and move it in a direction to force all the plates into frictional contact and against abutment 255. Since alternate plates are keyed with moving and stationary members, this results in quickly stopping the moving members particularly since the driving clutch 90 must be disconnected before the brake is operative, there being an intermediate position of spool 96 in which neither the clutch 90 nor brake 253 is operative.

What is claimed is:

1. In a milling machine, the combination of a bed, a table reciprocable thereon, a head on said bed adjacent said table and having different portions upstanding above said table and spaced apart in the direction of table movement and a top portion rigidly connecting the corresponding ends of said spaced head portions, a carrier for spacing said spaced head portions at intermediate points, a spindle rotatably supported from said carrier, said carrier being movable between said spaced head portions for vertical adjustment of said spindle, a power source, a speed change mechanism supported from said head adjacent said top portion, a power train connecting said speed change mechanism and spindle including a vertical shaft splined for carrier adjustment, and a train connecting said speed change mechanism with said power source.

2. In a milling machine the combination of a bed, a table horizontally reciprocable thereon, a head on said bed adjacent said table and having different portions upstanding above said table and spaced apart in the direction of table movement, a carrier for spacing said head portions at points intermediate the ends thereof, a spindle rotatably journaled in said carrier with its axis transverse to table movement, said carrier being relatively movable between said head portions for vertical adjustment of said spindle, a tool fixed for rotation with said spindle to project over said table in a predetermined axial alignment with said spindle, means for establishing and maintaining said alignment including a pendant and a plurality of overarms carried by said carrier above said spindle, said pendant being movable relative to said carrier in a direction parallel to the axis of said spindle, said overarms being spaced apart in the direction of table movement and each connecting both with said pendant and carrier to prevent other relative movement therebetween, and transmission mechanism for said spindle including an axially vertical rotatable transmission member positioned for its axis to pass between said overarms and a transmission element slidably splined with said member and journaled in said carrier.

3. In a milling machine the combination of a bed, a table horizontally reciprocable thereon, a head on said bed adjacent the table and having different portions upstanding above said table and spaced apart in the direction of table movement and a top portion rigidly connecting the top ends of said spaced portions, a speed change mechanism associated with said top portion, a carrier vertically movable between said spaced portions underneath said top portion, a spindle journaled in said carrier, a tool above said table and rotatable from said spindle in a predetermined position relative to said carrier, means for establishing and maintaining said tool position including a pendant providing a bearing for said tool and a plurality of overarms carried by said carrier above said spindle and spaced apart in the direction of table movement and each engaging both with said pendant and with said carrier, a transmission element vertically journaled for its axis to pass between said overarms, a power transmission member journaled in said top portion, and a train connecting said speed change mechanism and spindle through said element.

4. In a milling machine the combination of a stationary bed, a table horizontally reciprocable thereon, a head movable on said bed transversely to the direction of table movement, and having different portions each uprising above the plane of said table and spaced apart in the direction of table movement and having top and bottom portions respectively connecting the corresponding ends of said spaced portions, said bottom portion cooperating with said bed to form a slide guiding the movement of said head, a carrier closely fitted with each of said spaced head portions for vertical movement therebetween and located between said top and bottom head portions, a spindle journaled in said carrier, a power source associated with said bed, a spline shaft journaled for its axis to be parallel with the direction of head movement, another spline shaft journaled for its axis to be parallel with the direction of carrier movement, and a transmission connecting said power source and spindle and including each of said spline shafts.

5. In a milling machine the combination of a bed, a table reciprocable thereon a head adjacent said table and having different portions uprising above the plane of said table and spaced apart in the direction of table movement, a carrier vertically movable between said portions, a spindle journaled in said carrier, and transmission mechanism for said spindle including a rotatable member axially vertical and vertically movable with said carrier, a power source associated with said bed, and a train connecting said power source and said member including an axially vertical shaft connected from said source at its lower end and elements connecting the upper end thereof to drive said member in each of its various positions.

6. A milling machine as specified in claim 5 in which the elements connecting said vertical shaft to drive said member include a speed changer.

7. In a milling machine, the combination of a tool and a work support, and means for relative bodily movement therebetween including a first rate changer having rate change elements shiftable to alternative power transmitting and non-transmitting positions and lever means for quickly shifting said elements, a second rate changer including shafts having adjacent ends and gears removably connecting said shaft ends, and adapted to be interchangeably replaceable by gears of other drive ratio, a drive source common to both said rate changers and means for selectively interrupting the driving relation of each rate changer whereby either rate changer may be made inoperative when the other is in use.

8. In a machine tool, the combination of a movable support, feed and quick traverse transmissions therefor having a screw connected for support movement and common to both transmissions, clutch members respectively connected with opposite ends of said screw; and means for alternative actuation of said screw from either end thereof including an element formed for one end to engage with either of said members, a removable bracket journaling said element, and means for the alternative mounting of said bracket in a position to engage said element with the one or the other of said members, said bracket providing for exposing the other end of said element in either position of mounting, said exposed end being adapted to receive a removable element rotating member, and means carried by said bracket for urging the disengagement of said element from said clutch members, said element being axially shiftable in said bracket to overcome said means whereby to engage said element.

9. In a milling machine, the combination of a reciprocatory table, a table support, a feed and a rapid traverse transmission, a plurality of rotatable sleeves journaled in said support underneath said table and each in axial alignment with the path of table movement, clutch means shiftable to connect the one or the other of said transmissions with one of said sleeves, a shaft axially movable with said table and splinedly engaging a splined bore in the last mentioned sleeve, said shaft having an end adapted for connection with an attachment drive train, a screw axially movable with said table and engaging a bore in the other of said sleeves for table movement therefrom, and a reverser connecting said sleeves.

10. In a machine tool, the combination of a movable support, a rapid traverse transmission, a feed transmission, a clutch device connected with said support, clutch means for alternatively connecting the one or the other of said transmissions with said device, a trip element connected for operation of said clutch device and having positions respectively for dog contact and for dog clearance, a lever for shifting said trip element from one to the other of said positions, and an interlock operative between said clutch means and said lever, whereby said lever is prevented from a certain movement when a certain of said transmissions is connected.

11. In a machine tool having a movable support, the combination of transmission mechanism therefor including a feed train, a rapid traverse train, a clutch member shiftable to connect or disconnect said transmission with said table, and clutch means shiftable for connecting the one or the other of said trains, and control mechanism for said transmission including a trip element connected for movement of said member, a dog relatively movable in a certain path to contact said trip element to disengage said member, means for relative movement of said dog and trip element in another path to avoid contact therebetween whereby to permit reengagement of said clutch member, and an interlock preventing the operation of said means when said clutch means is in rapid traverse train connecting position.

12. In a machine tool having a movable support, the combination of transmission mechanism therefor including alternatively engageable rapid traverse and feed trains, power means for disengaging said transmission after a predetermined forward movement, manual means for re-engagement of said transmission for a further forward movement, and means preventing operation of said manual means when said rapid traverse train is engaged.

13. In a machine tool having a movable support, the combination of transmission mechanism engageable for alternative feed or rapid traverse thereof in either direction, power means for disengaging said transmission after a predetermined movement in a certain direction, manual means for re-engagement of said transmission in either direction, and means preventing operation of said manual means for re-engagement of rapid traverse in a certain direction.

14. In a machine tool having a movable table, and transmission mechanism therefor including feed and rapid traverse trains for movement of said table in either direction, the combination of control means including a power trip for disengaging said transmission at a predetermined point in a certain direction of table movement, manual means for thereafter re-engaging said transmission for movement in either direction, and an interlock operative on said manual means to prevent further table movement in the same direction at a rapid traverse rate.

15. In a machine tool having a movable support, the combination of a feed train, a rapid traverse train, a reverser having a shiftable member, a clutch member shiftable for alternatively connecting said trains with said support through said reverser member, a trip element connected for movement of said reverser member, a dog adapted to contact said trip element in a certain path of travel, manual means for relative movement of said element and dog out of said path, and an interlock preventing movement of said manual means when said clutch member is in a certain position.

16. In a machine tool having a movable support, the combination of a first resilient device adapted to transmit motion positively at a predetermined loading, a second resilient device adapted to fail to transmit motion at a predetermined loading greater than said loading of said first device, and a power transmission connected to actuate said support from one of said devices and to actuate the last mentioned device through the other of said devices.

17. In a machine tool having a movable support, the combination of a resilient device, means limiting the resilient movement thereof in the direction of movement under load, whereby loads in excess of a predetermined load are transmitted positively, a clutch device having power transmitting members mutually formed for the one to tend to disengage from the other under load, resilient means opposing a predetermined force against the disengagement of said members, and a power transmission connecting said devices for the one to actuate the other and for said other device to actuate said support.

18. In a machine tool having a movable support, the combination of an overload preventing device, a shock absorbing device, said devices being connected for the one to transmit power to the other, a feed rate changer, and transmission mechanism adapted to actuate said support alternatively through said rate changer or exclusive thereof from said other device.

19. In a machine tool having a movable support, the combination of a first device having a plurality of relatively movable power transmitting members and having resilient means adapted to separate said members at less than a predetermined load, a second device having a plurality of relatively movable power transmitting elements mutually formed to tend to separate under load, and having resilient means opposing a predetermined resistance to said element movement, said devices being connected for the one to transmit power to the other, a feed rate changer, and transmission mechanism adapted to actuate said support alternatively through said rate changer or exclusive thereof from said other device.

20. In a machine tool having a movable support, the combination of a plurality of overload preventing devices respectively of different load capacity, shock absorbing means, a feed rate changer, a power source, and transmission mechanism adapted to connect said source and said support alternatively through said rate changer and one of said devices or exclusive of said rate changer through the other of said devices and said shock absorbing means.

21. In a milling machine the combination of a bed, a table horizontally reciprocable thereon, a head on said bed adjacent said table and having different portions uprising above the plane of said table and spaced apart in the direction of table movement, a carrier vertically movable between said head portions, a spindle journaled in said carrier and having an end projecting therefrom, a flywheel fixed on said projecting end, and a power transmission mechanism for said spindle, including a plurality of axially aligned rotatable elements forming an axially vertical extensible coupling permitting vertical movement of said carrier.

22. In a milling machine the combination of a bed, a table horizontally reciprocable thereon, a head on said bed adjacent said table and having different uprising portions spaced apart in the direction of table movement, a carrier supported from each of said head portions for vertical movement therebetween, a spindle journaled in said carrier and axially transverse to the direction of table movement and having exposed ends, a tool fixed with the spindle end adjacent the table, a flywheel fixed with the other end of said spindle, a gear fixed on said spindle at an intermediate point, and a power transmission including a plurality of axially aligned rotatable elements forming an axially vertical extensible coupling, one of said elements being axially stationary and connected from a power source, and the other of said elements being vertically movable with said carrier and connected with said gear.

23. In a milling machine, the combination of a tool spindle, a work support reciprocable in a path transverse to the axis of said spindle, transmission mechanism for said spindle including a source of power, a feed line driven from said power source and including a rate changer, a quick traverse line driven from said power source to exclude said rate changer, a table drive train alternatively operable from said feed or quick traverse lines and including a shiftable motion interrupting reverser, power trip means shiftable to shift said reverser during movement of said support and including a dog normally operative to prevent immediate shifting of said trip means to the previous position while permitting of shifting to another position whereby to establish a different movement of said support, and an attachment drive train including a portion of said table train alternatively operable from said feed or quick traverse lines and including motion interrupting means manually operable independently of said reverser and trip means.

In witness whereof we hereto affix our signatures.

EDWARD J. KEARNEY.
JOSEPH B. ARMITAGE.